3,787,411
HETEROCYCLIC ETHERS OF PIPERAZINE
N ALKANOLS
Heinrich Ruschig, Bad Soden, Taunus, Karl Schmitt, Frankfurt am Main, Werner Mohler, Hofheim, Taunus, and Axel Göbel and Ernst Lindner, Frankfurt am Main, Germany, assignors to Farbwerke Hoechst Aktiengesellschaft vormals Meister Lucius & Bruning, Frankfurt am Main, Germany
No Drawing. Filed Sept. 8, 1970, Ser. No. 70,486
Claims priority, application Germany, Sept. 12, 1969,
P 19 46 172.4
Int. Cl. C07d 51/70
U.S. Cl. 260—268 PH                5 Claims

ABSTRACT OF THE DISCLOSURE

A heterocyclic ether of the formula

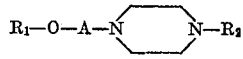

in which $R_1$ is 3-, 4- or 6-alkoxy-pyridyl-(2)-; 2-, 4-, 5-, or 6-alkoxy-pyridyl-(3); 2- or 3-alkoxy-pyridyl-(4) which have 1-4 carbon atoms in the alkoxy radical; 3-, 4-, 5- or 6-methyl-pyridyl-(2); 6 - ethyl - pyridyl - (4)-; 2,6-dimethyl-pyridyl-(4); $R_2$ is phenyl, o-tolyl, m-tolyl, p-tolyl, o-anisyl, m-anisyl, p-anisyl, o-chlorophenyl, m-chlorophenyl, p-chlorophenyl, pyridyl (2), pyridyl (3), pyridyl (4); 2-chloro-4-methyl-phenyl, 2-chloro - 4 - methoxyphenyl and 2-methoxy-4 - methyl - phenyl, 6 - methoxypyridyl (2), 2-methyl-pyridyl (4), 4,6-dimethyl-pyridyl (2) or their position isomers, and A is alkylene having from 2 to 6 carbon atoms wherein the same is ethylene, trimethylene, 2-methyl-ethylene, 3-methyl-ethylene, tetramethylene, 3-methyl-trimethylene, 2 - ethyl - ethylene, 1-ethyl-ethylene, pentamethylene, 4 - methyl - tetramethylene, 3-ethyl-trimethylene, 1-propyl - ethylene, 1 - isopropyl-ethylene, 1,2-dimethyl - ethylene, hexamethylene, 5-methyl-pentamethylene, 4 - ethyl - tetramethylene, 3 - propyl-trimethylene, 2-butyl-ethylene, 1 - butyl - ethylene or 1-methyl-3-ethyl-trimethylene; and physiologically tolerable acid addition salts thereof; these compounds have an α-sympatholytic action and are useful in the treament of shocks, migraine, hypertonia and blood circulation disorders of the extremities.

The present invention provides new heterocyclic ethers of the Formula I

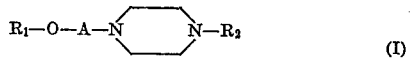

in which $R_1$ is an unsaturated mononuclear, nitrogen-containing heterocyclic ring which, in addition, may contain one sulfur atom and/or an annulated benzene ring, or may be substituted by lower alkyl, lower alkoxy, phenyl-lower alkyl or phenyl or by an oxo group, $R_2$ is phenyl optionally substituted by lower alkyl or lower alkoxy, chlorine or bromine and optionally containing 1 or 2 nitrogen atoms in the ring, and A is alkylene containing from 2 to 6 carbon atoms; and physiologically tolerable acid addition salts thereof.

Moreover, the present invention provides a process for the manufacture of the specified compounds which comprises reacting:
(a) Compounds of the Formula II $$R_1\text{—Hal} \qquad (II)$$

wherein Hal is halogen, with compounds of the Formula III

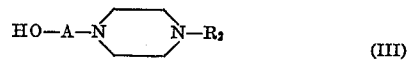

preferably in the form of their alkali metal or alkaline earth metal salts, or (b) Compounds of the Formula IV

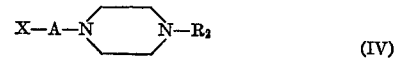

in which X is a halogen atom or a hydroxysulfonyloxy, alkylsulfonyloxy or arylsulfonyloxy group, with metal salts, preferably silver salts of compounds of the Formula V $$R_1\text{—OH} \qquad (V)$$

or (c) Reducing in known manner compounds of the Formula VI

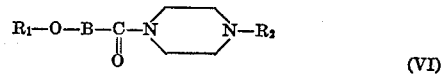

in which B is alkyl having from 1 to 5 carbon atoms, or
(d) Reacting compounds of the Formula VII $$Y\text{—NH}_2 \qquad (VII)$$

with compounds of the Formula VIII

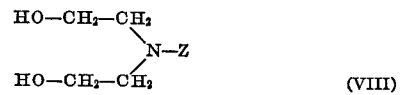

preferably in the form of their reactive esters, in which formula one of the symbols Y and Z stands for the group —$R_2$ and the other represents the radical $R_1$—O—A or (e) Reacting compounds of the Formula IX $$R_1\text{—O—A—NH—CH}_2\text{—CH}_2\text{—NH—R}_2 \qquad (IX)$$

with reactive esters of ethylene glycol and, if desired, converting salts so obtained into the free bases or bases into their acid addition salts.

As the group $R_1$ there may be used in addition to the corresponding unsubstituted radicals, for example, the following: 4,6-diphenyl-, 4 - methyl - 6 - phenyl-, 4,5-dimethyl-6-phenyl-, 4-ethyl-6-methyl-, 4-ethyl-5,6-dimethyl-, 4-benzyl-6-methyl-, 4-butyl-6-methyl-, 4-propyl-6-methyl-pyrimidinyl-(2)-; 3-, 4- or 6-alkoxy-pyridyl-(2)-, 2-, 4-, 5-, or 6-alkoxy-pyridyl-(3), 2- or 3-alkoxy-pyridyl-(4) which have 1-4 carbon atoms in the alkoxy radical; 3-, 4-, 5- or 6-methyl-pyridyl-(2)-, 6-ethyl-pyridyl-(4)-, 2,6-dimethyl-pyridyl - (4), 4-methyl-, or 4 - phenyl-quinolyl-(2)-, 2-methyl- or 2-phenyl-quinazolinyl-(4)-, 2-o-tolyl-, 2-m-tolyl- or 2-p-tolyl-1-oxo-phthalazinyl-(4)-; 4-methyl-thiazolinyl-(2)-and their position isomers.

As the radical $R_2$, there may be employed for example, the following: phenyl, o-tolyl, m-tolyl, p-tolyl, o-anisyl, m-anisyl, p-anisyl, o-chlorophenyl, m-chlorophenyl, p-chlorophenyl, pyridyl (2), pyridyl (3), pyridyl (4); 2-chloro-4-methyl-phenyl, 2-chloro-4-methoxy-phenyl and 2-methoxy-4-methyl-phenyl, 6-methoxy-pyridyl (2), 2-methyl-pyridyl (4), 4,6-dimethyl-pyridyl (2) and their position isomers.

As the group A there may be used, for example, the following alkylene radicals, in which the carbon atoms next to the oxygen atom is designated as $C_1$: ethylene, trimethylene, 2-methyl-ethylene, 3-methyl-ethylene, tetramethylene, 3-methyl-trimethylene, 2-ethyl-ethylene, 1-ethyl-ethylene, pentamethylene, 4-methyl-tetramethylene, 3-ethyl-tri-methylene, 1-propyl-ethylene, 1-isopropyl-ethylene, 1,2-dimethyl-ethylene, hexamethylene, 5-methyl-pentamethylene, 4 - ethyl-tetramethylene, 3 - propyl-tri-methylene, 2-butyl-ethylene, 1-butyl-ethylene and 1-methyl-3-ethyl-trimethylene.

(a) A preferred method of preparing the compounds of the invention is the reaction between a halogenated heterocyclic compound of the Formula II and a salt, preferably the sodium salt, of a hydroxyalkyl-piperazine of the Formula III in an inert solvent, for example benzene or one of its homologues, if required at an elevated temperature. The compounds of the Formula II may be obtained for example by reacting piperazine derivatives of the Formula XII

with halogenhydrine.

(b) The compounds of the Formula V are used in the form of their metal salts, preferably silver salts. The reaction is carried out according to known methods in a suitable solvent such as benzene, toluene or xylene, if required at an elevated temperature.

The starting materials of the Formula IV can be prepared from the corresponding hydroxy compounds by reacting them with a halogenating agent such as thionyl chloride or a sulfonic acid halide.

(c) The reduction of a piperazide of the Formula VI may likewise be performed in known manner, for example with a metal hydride such as lithium aluminum hydride.

The piperazides of the Formula VI are prepared for example from the corresponding chloroacyl piperazides by reacting them with compounds of the formula $R_1$—OH, in the form of their metal salts, preferably their silver salts, according to known methods. The corresponding chloroacyl piperazides can be obtained from the corresponding piperazines of the Formula XII

with a suitable chloroacetic acid derivative, for example chloracetylchloride.

(d) The compounds of the invention can furthermore be prepared on the one hand by the reaction of amines of the formula $$R_1—O—A—NH_2 \quad (X)$$

with compounds of the Formula XI

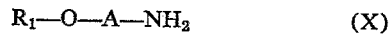
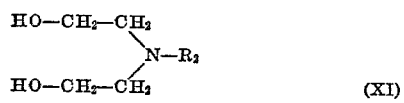

which latter are preferably used in the form of their reactive esters, for example those of hydrochloric or hydrobromic acid, p-toluene sulphonic acid or methyl-sulphuric acid. The reaction is carried out in known manner in an inert solvent, for example benzene or one of its homologues, optionally at an elevated temperature. The amines of the Formula X may be obtained, for example, by reacting a silver salt of a compound of the Formula V with chloracetonitrile and catalytically reducing the nitrile obtained to form the corresponding amine. The compounds of the Formula XI may be prepared by reaction of amines of the formula $H_2N$—$R_2$ with ethylene chlorohydrine and subsequent conversion of the bis-(hydroxyethyl)amines obtained into their reactive esters according to known methods, for example with thionylchloride into hydrochloric acid esters.

On the other hand, the compounds of the invention can be obtained by reacting compounds of the Formula XIII

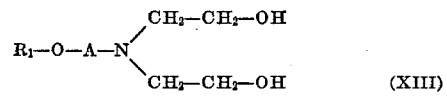

or their reactive esters with amines of the formula

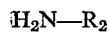

The compounds of the Formula XIII are prepared in analogy to those of Formula XI by reaction of amines of the Formula X with ethylenechlorohydrine and subsequent conversion of the bis-hydroxyethylamines thus formed into the corresponding reactive esters, for example esters of hydrochloric, hydrobromic or p-toluene-sulfonic acid.

(e) As reactive esters of ethyleneglycol preferably 1,2-dibromoethane or glycol-bis-methylsulfate are used. The reaction may be performed at an elevated temperature in a suitable solvent, for example an alcohol. Depending on the temperature desired, alcohols such as ethanol or n-butanol may be used. The starting materials of the Formula IX may be obtained by reaction of N—$R_2$—N'-chloracetylethylenediamines with silver salts of compounds of the Formula V and reduction of the resulting amides by means of a metal hydride, for example lithium aluminum hydride.

For the use as pharmaceutical agents, salts of non-toxic acids are preferably employed. Examples of such salt-forming acids are: hydrochloric, hydrobromic and hydroiodic, phosphoric, sulphuric, amidosulphonic, methyl-sulphuric and nitric acid; formic, acetic, propionic, succinic, tartaric, lactic, malonic, fumaric, citric, malic, mucic, benzoic, salicylic, aceturic, embonic, naphthalene-1, 5-disulphonic, ascorbic phenylacetic, n-amino-salicylic, hydroxyethanesulphonic and benzenesulphonic acid and synthetic resins containing acid groups.

The compounds of the present invention are especially distinguished by their α-sympatholytic action having, for instance, sedative, blood pressure lowering and vasodilatatory effects.

The α-sympatholytic activity was determined by the seminal vesicle test in guinea-pigs (cf. J. Brügger, Helv. Physiol. Acta 3, 117 (1945)). In this test the dose of test preparation that reduces by 50% the contraction provoked by 1.3 μg./ml. of adrenaline was determined on the isolated seminal vesicle. With 2-[3-(4-o-tolyl)piperazinyl (1)] propoxypiperidine hydrochloride this dose was, e.g., found to be $9.5 \times 10^{-3}$ μg./ml.

In contrast to known synthetic substances having similar action in the seminal vesicle test the compounds of the present invention have an outstanding sedative activity. The sedative action of 2[3-(4-o-tolyl)-piperazinyl (1)] propoxypyridine hydrochloride for instance can be proved in various animals such as mice, rats, guinea-pigs, cats and dogs already after subcutaneous administration of 10 mg. per kilogram.

In comparison to the pharmacologically effective doses, the toxicity of the products of the invention is low. Thus, for example the $DL_{50}$ of 2[3-(4-o-tolyl)-piperazinyl (1)] propoxy-pyridine hydrochloride after intravenous administration to a mouse is 30 mg. per kilogram only. On subcutaneous and oral administration the DL was 450 and 180 mg. per kilogram, respectively.

By reason of their pharmacodynamic action and the comparatively low toxicity, the compounds of the invention may be used, for example, for the therapy of shocks, migraine, hypertonia and disorders in the blood circulation of the extremities. The compounds are administered parenterally or, preferably, orally in the form of tablets, dragées, pills or powders formed with physiologically inert adjuvants and excipients such as starch, talcum, milk, sugar, magnesium stearate, tragacanth etc.

The following examples illustrate the invention:

EXAMPLE 1

(a) 2-[2-(4-o-tolyl)-piperazinyl (1)]-ethoxy-pyridine-hydrochloride

In a boiling solution of 110 g. of 1-o-tolyl-4-(2-hydroxyethyl)-piperazine in 500 ml. of absolute xylene 11.5 g. of sodium were dissolved within 3 hours. Subsequently, a solution of 79 g. of 2-bromopyridine in 150 ml. of xylene was added dropwise within 15 minutes and the whole was refluxed for 5 hours. The reaction mixture was then cooled to room temperature and evaporated in vacuo. The residue was treated with 500 ml. of ether and 200 ml. of water, the organic phase was separated and the aqueous phase washed 3 times with 200 ml. of ether. The combined organic solutions were dried with sodium sulfate and evaporated in vacuo. The residue (152 g. of the free base) was dissolved in ethanol and 237.5 ml. of 2 N hydrochloric acid were added. The solution was evaporated in vacuo and the residue was recrystallized from 350 ml. of isopropanol. 90 g. of the hydrochloride were obtained, M.P. 180–181° C.

In an analogous manner the following compounds were obtained using 1-o-tolyl-4-(2-hydroxyethyl)-piperazine as starting material:

(b) with 2,6-dimethyl-4-chloro-5-n-butyl-pyrimidine: 2,6-dimethyl - 4-[2-(4-o-tolyl)-piperazinyl(1)]-ethoxy-5-n-butyl-pyrimidine-hydrochloride, M.P. 173–174° C.;

(c) with 2,6-dimethyl-4-chloro-5-isopropyl-pyrimidine: 2,6 - dimethyl-4-[2-(4-o-tolyl)-piperazinyl(1)]-ethoxy-5-isopropyl-pyrimidine-hydrochloride, M.P. 190–191° C.;

(d) with 2,6-dimethyl-4-chloro-pyrimidine: 2,6-dimethyl- 4 - [2 - (4-o-tolyl)-piperazinyl(1)]-ethoxy-pyrimidine-hydrochloride, M.P. 176° C.;

(e) with 2-phenyl-4-chloro-5-n-butyl-6-methyl-pyrimidine; 2 - phenyl-4-[2-(4-o-tolyl)-piperazinyl(1)]-ethoxy-5-n-butyl-6-methyl-pyrimidine-hydrochloride, M.P. 202–203° C.;

(f) with 2-chloro-4,6-dimethyl-pyrimidine: 2-[2-(4-o-tolyl) - piperazinyl(1)]-ethoxy-4,6-dimethyl-pyrimidine-hydrochloride, M.P. 193° C.;

(g) with 4-chloro-5-n-butyl-6-methyl-pyrimidine: 4-[2-(4-o - tolyl) - piperazinyl(1)]-ethoxy-5-n-butyl-6-methyl-pyrimidine-hydrochloride, M.P. 188° C.;

(h) with 2,5,6-trimethyl-3-chloro-pyrazine: 2,5,6-trimethyl - 3 - [2 - (4 - o - tolyl)-piperazinyl(1)]-ethoxy-pyrazine-hydrochloride, M.P. 183.5–184° C.;

(i) with 2-methyl-3-chloro-pyrazine: 2-methyl-3-[2-(4-o-tolyl) - piperazinyl(1)]-ethoxy-pyrazine-hydrochloride, M.P. 198° C.;

(k) with 3-methyl-6-chloro-pyridazine: 3-methyl-6-[2-(4-o - tolyl) - piperazinyl(1)] - ethoxy-pyridazine-hydrochloride, M.P. 196.5° C.;

(l) with 3-phenyl-6-chloro-pyridazine: 3-phenyl-6-[2-(4-o-tolyl) - piperazinyl(1)] - ethoxy - pyridazine - hydrochloride, M.P. 193° C.;

(m) with 2-methyl-3-chloro-quinoxaline: 2-methyl-3-[2-(4 - o-tolyl)-piperazinyl(1)]-ethoxy-quinoxaline-hydrochloride, M.P. 208° C.;

(n) with 1-oxo-2-phenyl-4-chloro-1,2-dihydro-phthalazine: 1 - oxo - 2 - phenyl-4-[2-(4-o-tolyl)-piperazinyl(1)]-ethoxy-1, 2-dihydro-phthalazine-hydrochloride, M.P. 270° C.;

(o) with 2-chloro-quinoline: 2-[2-(4-o-tolyl)-piperazinyl (1)]-ethoxy-quinoline-hydrochloride, M.P. 182.5° C.;

(p) with 2-chloro-4-methyl-quinoline: 2-[2-(4-o-tolyl)-piperazinyl(1)]-ethoxy-4-methyl-quinoline-hydrochloride, M.P. 175° C.;

(q) with 2-chlorobenzthiazol: 2-[2-(4-o-tolyl)-piperazinyl-(1)]-ethoxy-benzthiazol-hydrochloride, M.P. 208° C.

Using 1-m-tolyl-4-(2-hydroxyethyl)-piperazine as starting material there were obtained:

(r) with 2,6-dimethyl-4-chloro-pyrimidine: 2,6-dimethyl-4-[2-(4-m-tolyl)-piperazinyl(1)]-ethoxy-pyrimidine-hydrochloride, M.P. 189° C.;

(s) wtih 2,6-dimethyl-4-chloro-5-n-butyl-pyrimidine: 2,6-dimethyl-4-[2-(4-m-tolyl)-piperazinyl(1)]-ethoxy-5-n-butyl-pyrimidine-hydrochloride, M.P. 152° C.;

(t) with 2,6-dimethyl-4-chloro-5-isopropyl-pyrimidine: 2,6-dimethyl-4-[2-(4-m-tolyl)-piperazinyl(1)]-ethoxy-5-isopropyl-pyrimidine-hydrochloride, M.P. 148.5° C.;

(u) with 2-phenyl-4-chloro-5-n-butyl-6-methyl-pyrimidine: 2-phenyl-4-[2-(4-m-tolyl)-piperazinyl(1)]-ethoxy-5-n-butyl-6-methyl-pyrimine-hydrochloride, M.P. 174–175° C.;

(v) with 2-phenyl-4-chloro-5-isopropyl-6-methyl-pyrimidine: 2-phenyl-4-[2-(4-m-tolyl)-piperazinyl(1)]-ethoxy-5-isopropyl-6-methyl-pyrimidine-hydrochloride, M.P. 176° C.;

(w) with 2-phenyl-4-chloro-6-methyl-pyrimidine: 2-phenyl-4-[2-(4-m-tolyl)-piperazinyl(1)]-ethoxy-6-methyl-pyrimidine-hydrochloride, M.P. 195.5–196° C.;

(x) with 4-chloro-5-n-butyl-6-methyl-pyrimidine: 4-[2-(4-m-tolyl)-piperazinyl(1)]-ethoxy-5-n-butyl-6-methyl-pyrimidine-hydrochloride, M.P. 124–124.5° C.;

(y) with 2-chloro-4,6-dimethyl-pyrimidine: 2-[2-(4-m-tolyl)-piperazinyl(1)]-ethoxy-4,6-dimethyl-pyrimidine-hydrochloride, M.P. 172–173° C.;

(z) with 2-methyl-3-chloro-pyrazine: 2-methyl-3-[2-(4-m-tolyl)-piperazinyl(1)]-ethoxy-pyrazine-hydrochloride, M.P. 128° C.;

(aa) with 2,5,6-trimethyl-3-chloro-pyrazine: 2,5,6-trimethyl-3-[2-(4-m-tolyl)-piperazinyl(1)]-ethoxy-pyrazine-hydrochloride, M.P. 162° C.;

(ab) with 2-methyl-6-chloro-pyridazine: 3-methyl-6-[2-(4-m-tolyl)-piperazinyl(1)]-ethoxy-pyridazine-hydrochloride, M.P. 163–164° C.;

(ac) with 2-methyl-3-chloro-quinoxaline: 2-methyl-3-[2-(4-m-tolyl)-piperazinyl(1)]-ethoxy-quinoxaline-hydrochloride, M.P. 172° C.;

(ad) with 2-bromopyridine: 2-[2-(4-m-tolyl)-piperazinyl (1)]-ethoxy-pyridine, M.P. 167° C.;

(ae) with 1-oxo-2-phenyl-4-chloro-1,2-dihydrophthalazine: 1-oxo-2-phenyl-4-[2-(4-m-tolyl)-piperazinyl(1)]-ethoxy-1,2-dihydrophthalazine-hydrochloride, M.P. 247° C.;

(af) with 2-chloroquinoline: 2-[2-(2-m-tolyl)-piperazinyl (1)]-ethoxy-quinoline-hydrochloride, M.P. 166–167° C.;

(ag) with 2-chloro-4-methyl-quinoline: 2-[2-(4-m-tolyl)-piperazinyl(1)]-ethoxy-4-methyl-quinoline-hydrochloride, M.P. 178° C.;

(ah) with 2-chloro-benzthiazol: 2-[2-(4-m-tolyl)-piperazinyl(1)]-ethoxy-benzthiazol, M.P. 231–232° C. (with decomposition);

Using 1-p-tolyl-4-(2-hydroxyethyl)-piperazine as starting material there were obtained:

(ai) with 2,6-dimethyl-4-chloro-5-n-butyl-pyrimidine: 2,6-dimethyl-4-[2-(4-p.tolyl)-piperazinyl(1)]-ethoxy-5-n-butyl-pyrimidine-hydrochloride, M.P. 172–172.5° C.;

(ak) with 2,6-dimethyl-4-chloro-5-isopropyl-pyrimidine: 2,6-dimethyl-4-[2-(4-p-tolyl)-piperazinyl(1)]-ethoxy-5-isopropyl-pyrimidine-hydrochloride, M.P. 171° C.;

(al) with 2-phenyl-4-chloro-5-isopropyl-6-methyl-pyrimidine: 2-phenyl-4-[2-(4-p-tolyl)-piperazinyl(1)]-ethoxy-5-isopropyl-6-methyl-pyrimidine-hydrochloride, M.P. 177° C.;

(am) with 2-phenyl-4-chloro-5-n-butyl-6-methyl-pyrimidine: 2-phenyl-4-[2-(4-p-tolyl)-piperazinyl(1)]-ethoxy-5-n-butyl-6-methyl-pyrimidine-hydrochloride, M.P. 149–150° C.;

(an) with 2,6-dimethyl-4-chloro-5-isobutyl-pyrimidine: 2,6-dimethyl-4-[2-(4-p-tolyl)-piperazinyl(1)]-ethoxy-5-isobutyl-pyrimidine-hydrochloride, M.P. 171.5° C.;

(ao) with 2-phenyl-4-chloro-6-methyl-pyrimidine: 2-phenyl-4-[2-(4-p-tolyl)-piperazinyl(1)]-ethoxy-6-methyl-pyrimidine-hydrochloride, M.P. 198° C.;

(ap) with 2,6-dimethyl-4-chloro-pyrimidine: 2,6-dimethyl-4-[2-(4-p-tolyl)-piperazinyl(1)]-ethoxy-pyrimidine-hydrochloride, M.P. 156° C.;

(aq) with 2-chloro-4,6-dimethyl-pyrimidine: 2-[2-(4-p-tolyl)-piperazinyl(1)]-ethoxy-4,6-dimethyl-pyrimidine-hydrochloride, M.P. 179.5° C.;

(ar) with 2-methyl-3-chloro-pyrazine: 2-methyl-3-[2-(4-p-tolyl)-piperazinyl(1)]-ethoxy-pyrazine-hydrochloride, M.P. 194° C.;

(as) with 3-methyl-6-chloro-pyridazine: 3-methyl-6-[2-(4-p-tolyl)-piperazinyl(1)]-ethoxy-pyridazine-hydrochloride, M.P. 178° C.;

(at) with 2-methyl-3-chloro-quinoxaline: 2-methyl-3-[2-(4-p-tolyl)-piperazinyl(1)]-ethoxy-quinoxaline-hydrochloride, M.P. 184° C.;

(au) with 2-bromo-pyridine: 2-[2-(4-p-tolyl)-piperazinyl(1)]-ethoxy-pyridine-hydrochloride, M.P. 155° C.;

(av) with 1-oxo-2-phenyl-4-chloro-1,2-dihydrophthalazine: 1-oxo-2-phenyl-4-[2-(4-p-tolyl)-piperazinyl(1)]-ethoxy-1,2-dihydrophthalazine-hydrochloride, M.P. 253° C.;

(aw) with 2-chloro-4-methyl-quinoline: 2-[2-(4-p-tolyl)-piperazinyl(1)]-ethoxy-4-methyl-quinoline-hydrochloride, M.P. 169–171° C.;

(ax) with 2-chloro-quinoline 2-[2-(4-p-tolyl)-piperazinyl-(1)]-ethoxy-quinoline-hydrochloride, M.P. 170.5° C.;

(ay) with 2-chloro-benzthiazol: 2-[2-(4-p-tolyl)-piperazinyl(1)]-ethoxy-benzthiazol, M.P. 162–163° C.;

When using 1-phenyl-4-(2-hydroxyethyl)-piperazine as starting material there were obtained:

(az) with 2,6-dimethyl-4-chloro-5-n-butyl-pyrimidine: 2,6-dimethyl-4-[2-(4-phenyl)-piperazinyl(1)]-ethoxy-5-n-butyl-pyrimidine-hydrochloride, M.P. 173–174° C.;

(ba) with 2,6-dimethyl-4-chloro-pyrimidine: 2,6-dimethyl-4-[2-(4-phenyl)-piperazinyl(1)]-ethoxy-pyrimidine-hydrochloride, M.P. 167° C.;

(bb) with 2,6-dimethyl-5-isopropyl-4-chloro-pyrimidine: 2,6-dimethyl-4-[2-(4-phenyl)-piperazinyl(1)]-ethoxy-5-isopropyl-pyrimidine-hydrochloride, M.P. 183–184° C.;

(bc) with 2-phenyl-4-chloro-5-n-butyl-6-methyl-pyrimidine: 2-phenyl-4-[2-(4-phenyl)-piperazinyl(1)] ethoxy-5-n-butyl-6-methyl-pyrimidine-hydrochloride, M.P. 165° C.;

(bd) with 2-phenyl-4-chloro-5-isopropyl-6-methyl-pyrimidine: 2-phenyl-4-[2-(4-phenyl)-piperazinyl(1)]-ethoxy-5-isopropyl-6-methyl-pyrimidine-hydrochloride, M.P. 176° C.;

(be) with 2-(2′,2′-diphenylethyl)-4-chloro-5-n-butyl-6-methylpyrimidine: 2-(2′,2′-diphenylethyl)-4-[2-(4-phenyl)-piperazinyl(1)]-ethoxy-5-n-butyl-6-methyl-pyrimidineoxalate, M.P. 138.5° C.;

(bf) with 2-phenyl-4-chloro-6-methyl-pyrimidine: 2-phenyl-4-[2-(4-phenyl-piperazinyl(1)]-ethoxy-6-methyl-pyrimidine-hydrochloride, M.P. 200° C.;

(bg) with 2-phenyl-4-chloro-6-benzyl-pyrimidine: 2-phenyl-4-[2-(4-phenyl)-piperazinyl(1)]-ethoxy-6-benzyl-pyrimidine-hydrochloride, M.P. 186° C.;

(bh) with 2 - chloro-4,6-dimethyl-pyrimidine: 2-[2-(4-phenyl)-piperazinyl(1)]-ethoxy-4,6-dimethyl-pyrimidine-hydrochloride, M.P. 187–188.5° C.;

(bi) with 2,5,6-trimethyl-3-chloro-pyrazine: 2,5,6-trimethyl-3-[2-(4-phenyl)-piperazinyl(1)]-ethoxy-pyrazine-hydrochloride, M.P. 140.5° C.;

(bk) with 2-methyl-3-chloro-pyrazine: 2-methyl-3-[2-(4-phenyl)-piperazinyl(1)]-ethoxy-pyrazine-hydrochloride, M.P. 165° C.;

(bl) with 2-chloro-thiazol: 2-[2-(4-phenyl)-piperazinyl-(1)]-ethoxy-thiazol-hydrochloride, M.P. 127° C.;

(bm) with 3-methyl-6-chloro-pyridazine: 3-methyl-6-[2-(4-phenyl)-piperazinyl(1)]-ethoxy-pyridazine-hydrochloride, M.P. 173° C.;

(bn) with 3-phenyl-6-chloro-pyridazine: 3-phenyl-6-[2-(4-phenyl)-piperazinyl(1)]-ethoxy-pyridazine-hydrochloride, M.P. 187° C.;

(bo) with 2-methyl-3-chloro-quinoxaline: 2-methyl-3-[2-(4-phenyl)-piperazinyl(1)]-ethoxy-quinoxaline-hydrochloride, M.P. 193° C.;

(bp) with 2-bromo-pyridine: 2-[2-(4-phenyl)-piperazinyl(1)]-ethoxy-pyridine-hydrochloride, M.P. 141° C.;

(bq) with 1-oxo-2-phenyl-4-chloro-1,2-dihydrophthalazine: 1-oxo-2-phenyl-4-[2-(4-phenyl)-piperazinyl-(1)]-ethoxy-1,2-dihydrophthalazine-hydrochloride, M.P. 229° C.;

(br) with 2-chloro-quinoline: 2-[2-(4-phenyl)-piperazinyl(1)]-ethoxy-quinoline-hydrochloride, M.P. 198.5° C.;

(bs) with 2-chloro-4-methyl-quinoline: 2-[2-(4-phenyl)-piperazinyl(1)]-ethoxy-4-methyl-quinoline-hydrochloride, M.P. 158° C.;

(bt) with 2-chloro-benzthiazol: 2-[2-(4-phenyl)-piperazinyl(1)]-ethoxy-benzthiazol-hydrochloride, M.P. 211.5° C.;

Using 1-(2-chloro-4-methyl-phenyl) - 4 - (2 - hydroxyethyl)-piperazine as starting material there was obtained:

(bu) with 2-chlorobenzthiazol: 2-(2-[4-<2-chloro-4-methyl-phenyl>)-piperazinyl(1)]-ethoxy-benzthiazol-hydrochloride, M.P. 218° C.;

Using 1-pyridyl(2)-4-(2-hydroxyethyl)-piperazine as starting material there were obtained:

(bv) with 2-chloro-quinoline: 2-[(4-pyridyl(2))-piperazinyl(1)]-ethoxy-quinoline-hydrochloride, M.P. 183° C.;

(bw) with 2-chlorobenzthiazol: 2-[2-(4-pyridyl(2))-piperazinyl(1)]-ethoxy-benzthiazol-hydrochloride, M.P. 200° C.;

Using 1-o-tolyl-4-(3-hydroxy - propyl) - piperazine as starting material there were obtained:

(bx) with 2-bromopyridine: 2-[3-(4-o-tolyl))-piperazinyl (1)]-propoxy-pyridine-hydrochloride, M.P. 187–188° C.;

(by) with 2-chloro-benzthiazol: 2-[3-(4-o-tolyl)-piperazinyl(1)]-propoxy-benzthiazol-hydrochloride, M.P. 189.5° C.;

Using 1-phenyl-4-(4-hydroxybutyl)-piperazine and 2-bromo-pyridine there was obtained:

(bz) 2-[4-(4-phenyl)-piperazinyl(1)]-butoxy-pyridine-hydrochloride, M.P. 164.5° C.;

Using 1-[4,5-dimethyl-pyrimidinyl(2)]-4-(2 - hydroxyethyl)-piperazine and 2-bromo - pyridine there was obtained:

(ca) 2-[2-(4,4,6-dimethyl-pyrimidinyl(2))-piperazinyl (1)]-ethoxy-pyridine-hydrochloride, M.P. 189–190° C.;

EXAMPLE 2

2-[2-(4-o-tolyl)-piperazinyl(1)]-ethoxy-pyridine-hydrochloride 10.1 g. of the silver salt of 2-hydroxy-pyridine were suspended in 100 ml. of absolute toluene and a solution of 13.4 g. of 1-o-tolyl-4-(2-chlorethyl)-piperazine in 200 ml. of absolute toluene was added dropwise thereto while stirring. Subsequently, the whole was heated at 80° C. for 6 hours, cooled to room temperature and the solvent was evaporated in vacuo. After a work up according to Example 1, 14 g. of a free base were obtained which were converted into the monohydrochloride according to the method described in Example 1. From isopropanol the yield was 6 g., M.P. 180–181° C.

The starting compounds were prepared in the following manner:

Silver salt of 2-hydroxypyridine:

2-hydroxypyridine was dissolved in an equimolar amount of 2 N sodium hydroxide solution, the solution was filtered if necessary and shaken for one day in the dark with an equimolar quantity of silver nitrate. After the precipitate which initially was dark had become white, the whole was filtered, washed with water and dried in vacuo over phosphorus-pentoxide.

1-o-tolyl-4-(2-chlorethyl)-piperazine:

A solution of 58.5 g. of 1-o-tolyl-4-(2-hydroxyethyl) piperazine, in 125 ml. of absolute benzene, was added dropwise at 20 to 30° C. to a solution of 25 ml. of thionyl chloride in 250 ml. of absolute benzene while stirring and occasionally cooling with ice. After stirring at room temperature for one hour, the reaction solution was suction-filtered, the residue was washed with absolute benzene and dried in vacuo, whereby 72 g. of the hydrochloride were obtained. After recrystallization from absolute ethanol 46 g. of pure hydrochloride were obtained. For preparing the free base, the hydrochloride was dissolved in the smallest possible amount of water, mixed with a concentrated solution of sodium hydroxide in water and salted out with potassium carbonate. The free base was extracted with toluene and the toluene solution dried over potassium carbonate. The contents were determined titrimetrically.

EXAMPLE 3

2-[2-(4-o-tolyl)-piperazinyl(1)]-ethoxy-pyridine-hydrochloride

A solution of 13.4 g. of 1-(pyridyl(2)oxy-acetyl)-4-(4-o-tolyl)-piperazine in 50 ml. of absolute ether was added dropwise to a suspension of 3 g. of LiAlH$_4$ in 220 ml. of absolute ether at room temperature while stirring. The whole was refluxed for 3 hours while stirring, then cooled to room temperature; the excess lithium alanate was decomposed with 100 ml. of ethyl acetate. After standing overnight at room temperature, the whole was mixed with 50 ml. of 2 N potassium hydroxide solution, the ether phase was separated and dried over potassium carbonate and evaporated. The residue (10 g. of the free base) was converted into the monohydrochloride according to the method described in Example 1. After several recrystallizations from isopropanol, 3 g. of monohydrochloride were obtained, M.P. 180–181° C.

Preparation of the starting compound:

11.3 g. of chloracetylchloride were added dropwise to a solution of 35.2 g. of 1-o-tolyl-piperazine in 500 ml. of absolute benzene. After 30 minutes the precipitate consisting of 1-o-tolyl-piperazine-hydrochloride was suction-filtered and the solution was evaporated in vacuo. 17.1 g. of 1-chloracetyl-4-o-tolyl-piperazine were obtained, which were dissolved in 150 ml. of absolute toluene and added with stirring to a suspension of 12.4 g. of silver salt of 2-hydroxypyridine in 100 ml. of absolute toluene.

After refluxing for 6 hours with stirring, the whole was cooled to room temperature and filtered. The filtrate was evaporated in vacuo, the oily residue was mixed with water and extracted three times with ether. After drying over sodium sulfate, the organic phase was evaporated in vacuo. 15.5 g. of a bright oil remained which was used for further reactions without purification.

EXAMPLE 4

2-[2-(4-phenyl)-piperazinyl(1)]-ethoxy-pyridine-hydrochloride 13.8 g. of 2-(2-aminoethoxy)-pyridine and 21.8 g. of N,N-bis-(2-chlorethyl)-aniline were refluxed in 50 ml. of isopropanol for three hours. The reaction mixture was evaporated in vacuo, the residue was mixed with a 50% aqueous solution of potassium carbonate and extracted three times with ether. The ether phase was dried over sodium sulfate and evaporated. The base thus obtained was dissolved in acetone, 50% of which were acidified with HCl in ethanol to a pH of 3 and the remainder was added thereto. The precipitated crystals were recrystallized from ethanol. The yield was 7 g., melting at 141° C.

EXAMPLE 5

2-[2-(4-phenyl)-piperazinyl(1)]-ethoxy-pyridine-hydrochloride 13.8 g. of 2-(2-amino-ethoxy)-pyridine were dissolved in 50 ml. of ethanol and mixed with 6 ml. of condensed ethylene oxide. After standing at room temperature for four days the whole was evaporated in vacuo, the oily residue was dissolved in dry chloroform and 20.8 g. of phosphorus pentachloride were added while cooling. After refluxing for one hour the reaction mixture was poured on ice. The chloroform phase was separated, dried over sodium sulfate and evaporated in vacuo. The residue was refluxed for 3 hours with 6.2 g. of aniline and 10.6 g. of sodium carbonate in 100 ml. of methanol, the solution was filtered hot and evaporated in vacuo. The base obtained was converted into the monohydrochloride as in Example 4. After recrystallization in ethanol, 5 g. of the product were obtained melting at 141° C.

What is claimed is:

1. A heterocyclic ether of the formula

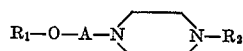

in which R$_1$ is 3-, 4- or 6-alkoxy-pyridyl-(2)-; 2-, 4-, 5-, or 6-alkoxy-pyridyl-(3); 2- or 3-alkoxy-pyridyl-(4) which have 1–4 carbon atoms in the alkoxy radical; 3-, 4-, 5- or 6-methyl-pyridyl-(2); 6-ethyl-pyridyl-(4)-; 2,6-dimethyl-pyridyl-(4); R$_2$ is phenyl, o-tolyl, m-tolyl, p-tolyl, o-anisyl, m-anisyl, p-anisyl, o-chlorophenyl, m-chorophenyl, p-chlorophenyl, pyridyl (2), pyridyl (3), pyridyl (4); 2-chloro-4-methyl-phenyl, 2-chloro-4-methoxy-phenyl or 2-methoxy-4-methyl-phenyl; 6-methoxy-pyridyl (2), 2-methyl-pyridyl (4), or 4,6-dimethyl-pyridyl (2); and A is alkylene having from 2 to 6 carbon atoms wherein the same is ethylene, trimethylene, 2-methyl-ethylene, 3-methyl - ethylene, tetramethylene, 3 - methyl - trimethylene, 2 - ethyl - ethylene, 1 - ethyl - ethylene, pentamethylene, 4-methyl-tetramethylene, 3-ethyl-trimethylene, 1-propyl-ethylene, 1-isopropyl - ethylene, 1,2 - dimethyl - ethylene, hexamethylene, 5-methyl-pentamethylene, 4-ethyl-tetramethylene, 3 - propyl - trimethylene, 2 - butyl - ethylene, 1-butyl-ethylene or 1-methyl-3-ethyl-trimethylene; and physiologically tolerable acid addition salts theerof.

2. A heterocyclic ether of the formula

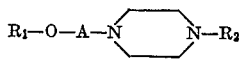

in which R$_1$ is pyridyl; R$_2$ is phenyl or tolyl, and A is alkylene having from 2 to 4 carbon atoms; and physiologicaly tolerable acid addition salts thereof.

3. 2-[3-(4-o-tolyl) - piperazinyl - (1)] - propoxy-pyridine-hydrochloride.

4. 2-[2-(4-o-tolyl)-piperazinyl(1)] - ethoxy - pyridine-hydrochloride.

5. 2-[3-(4-o-tolyl)-piperazinyl(1)] - propoxy-pyridine, or physiologically tolerable salts thereof.

References Cited
UNITED STATES PATENTS

| | | | |
|---|---|---|---|
| 3,051,709 | 8/1962 | Shapiro et al. | 260—268 PH |
| 3,277,094 | 10/1966 | Werner | 260—268 PH |
| 3,367,936 | 2/1968 | Koppe | 260—268 PH |
| 3,420,634 | 2/1969 | Palazzo | 260—268 BC |
| 3,502,667 | 3/1970 | Nakanishi | 260—268 BC |
| 3,239,524 | 3/1966 | Cowrle | 260—268 BC |
| 3,534,085 | 10/1970 | Narayawaw | 260—268 BC |
| 3,701,777 | 10/1972 | Edenhofer et al. | 260—268 PH |
| 3,706,755 | 12/1972 | Edenhofer et al. | 260—268 PH |

DONALD E. DAUS, Primary Examiner

U.S. Cl. X.R.

260— 21 R, 250 A, 256 Y, 264.3 Q, 268 PH, 268 C, 270 R, 288 R, 296 AE, 302 R, 304 R; 424—250, 251, 263, 270